3,374,251
17-(ALIPHATIC HYDROCARBONOXY) AND 17-(SUBSTITUTED ALIPHATIC HYDROCARBONOXY) ESTRANE DERIVATIVES
Alexander D. Cross, Mexico City, Mexico, assignor to Syntex Corporation, Panama, Panama, a corporation of Panama
No Drawing. Filed May 24, 1963, Ser. No. 282,844
17 Claims. (Cl. 260—397.1)

This invention relates to novel cyclopentanopolyhydrophenanthrene derivatives and to processes for their preparation.

More particularly, this invention relates to novel 17-(aliphatic hydrocarbonoxy) and 17-(substituted aliphatic hydrocarbonoxy)estrane derivatives represented by the general formulas:

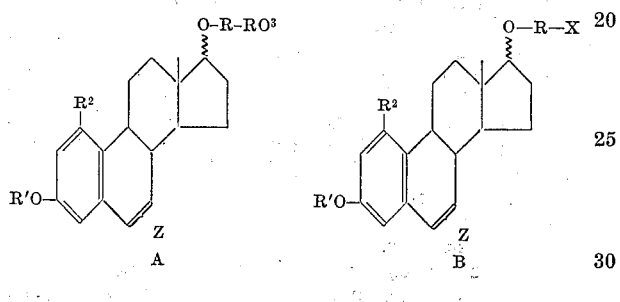

In these formulas, R represents a saturated or unsaturated, straight or branched chain aliphatic hydrocarbon residue containing from 1 to 10 carbon atoms, inclusive, such as ethylene, i.e., —$CH_2$—$CH_2$—, propylene, butylene, hexamethylene, octamethylene, isooctalene, 2,3-dimethylheptalene, 2-methyl-3-ethylheptalene, but-1-enylene, 2-methylbut-2-enylene, but-1-inylene, isooct-2-enylene, 2,3-dimethylhept-2-enylene, 2-methyl-3-ethylhept - 2 - enylene, and the like, with R preferably being ethylene in Formula B; the group $OR^1$ represents a hydroxyl group, an acyloxy group or an ether group; i.e., $R^1$ represents hydrogen, an acyl group, or a saturated or unsaturated, straight or branched chain aliphatic, cycloaliphatic or aromatic-aliphatic group containing from 1 to 12 carbon atoms, inclusive, and preferably a hydrocarbon group containing up to 10 carbon atoms, such as methyl, ethyl, propyl, isopropyl, isoamyl, n-decyl, cyclohexyl, cyclohexenyl, benzyl, and the like, and $R^2$ represents hydrogen or methyl.

In the grouping $OR^3$, which is substituted on a primary, secondary or tertiary carbon atom of the group R, $R^3$ represents hydrogen or an acyl group.

The symbol X represents hydrogen, a halogen, e.g., fluorine or chlorine, an N,N-dialkylamino group, preferably an N,N-di(lower)alkylamino group such as N,N-dimethylamino and the like, a carboxyl group, a cyano group, or an aldehydic oxygen (i.e., an oxygen atom doubly bonded to a carbon atom of the group R, said carbon atom also having a hydrogen atom attached thereto).

The symbol Z represents a saturated linkage or a double bond at the 6, 7-position in the steroid nucleus.

This invention further relates to the novel 17-(aliphatic hydrocarbonoxy)- and 17-(substituted aliphatic hydrocarbonoxy)-$\Delta^4$-estren-3-ones obtained from said 17-(aliphatic hydrocarbonoxy) and 17-(substituted aliphatic hydrocarbonoxy) estrane derivatives and represented by the general formulas:

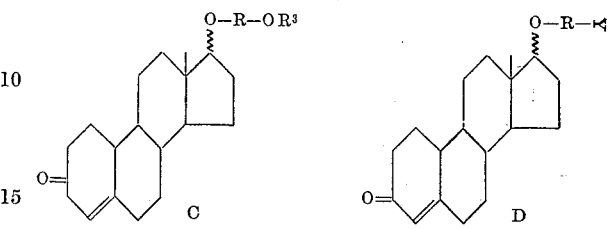

In these formulas R and $R^3$ have the same meaning as set forth hereinabove for Formulas A and B, with R preferably being ethylene in Formula D, and Y represents hydrogen, a halogen, e.g. fluorine or chlorine, or an N,N-dialkylamino group, preferably an N,N-di(lower) alkylamino group such as N,N-dimethylamino and the like.

The symbol ⟩ at the 17-position in the above formulas and in those that follow signifies that the aliphatic hydrocarbonoxy or substituted aliphatic hydrocarbonoxy substituent at the 17-position can be in either the $\alpha$- or the $\beta$- configuration.

The acyl and acyloxy groups referred to hereinabove are derived from carboxylic acids, preferably hydrocarbon carboxylic acids, of less than 12 carbon atoms. These acids can be saturated or unsaturated, of straight, branched, cyclic or cyclic-aliphatic chain, or aromatic, and may be substituted with functional groups such as hydroxyl groups, alkoxy groups containing up to 5 carbon atoms, acyloxy groups containing up to 12 carbon atoms, nitro groups, amino groups and halogens. Typical ester groups are the acetate, trimethylacetate, t-butylacetate, aminoacetate, phenoxyacetate, propionate, $\beta$-chloropropionate, cyclopentylpropionate, enanthate and benzoate.

The novel 17-(aliphatic hydrocarbonoxy) and 17-(substituted aliphatic hydrocarbonoxyl)-$\Delta^{1,3,5(10)}$-estratrienes represented by Formula A above have remarkable estrogenic activity, and are useful in fertility control and in lowering chlosterol levels in blood. In addition, they serve as intermediates for the preparation of the compounds of Formulas B and C.

The novel 17-(aliphatic hydrocarbonoxy) and 17-substituted aliphatic hydrocarbonoxy)-$\Delta^{1,3,5(10)}$ - estratrienes represented by Formula B above are also strong estrogenic agents with enhanced blood chlosterol-lowering activity. In addition, they serve as intermediates for the preparation of the compounds of Formula D.

The novel 17-(aliphatic hydrocarbonoxy)- and 17-(substituted aliphatic hydrocarbonoxy)-$\Delta^4$-estren-3-ones represented by Formulas C and D above are anabolic-androgenic agents having a favorable anabolic-androgenic ratio. They also have anti-estrogenic, anti-gonadotropic, anti-fibrillatory and appetite-stimulating properties, and further serve to lower blood chlosterol levels, relieve premenstrual tension and suppress the output of the pituitary gland.

The compounds of the present invention can be obtained by the methods illustrated by the following sequence of reactions:

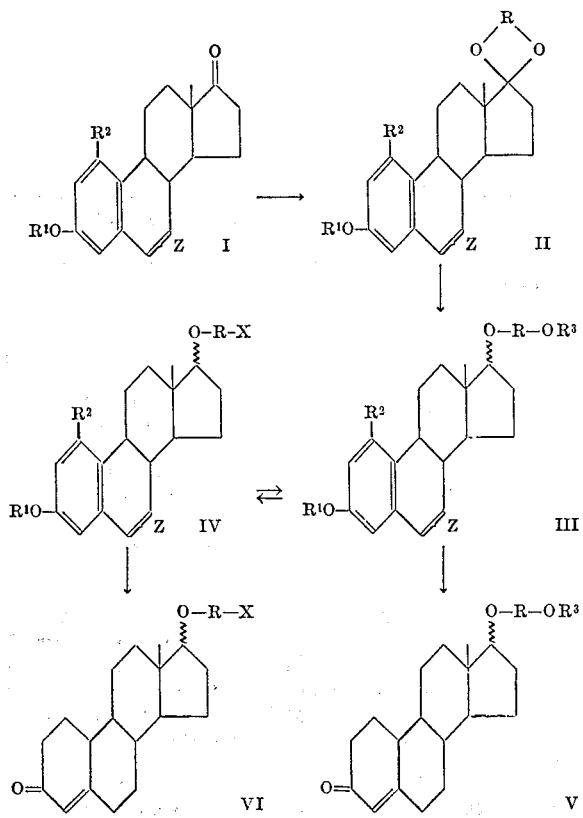

In the above formulas each of R, $R^1$, $R^2$, $R^3$, X, Y and Z have the same meanings as set forth hereinabove for Formulas A–D.

In practicing the methods outlined above, the estrone derivative (I) employed as the starting material, e.g., estrone methyl ether, is reacted with a dihydric alcohol, preferably an aliphatic hydrocarbon diol, of up to 10 carbon atoms, such as ethylene glycol, propylene glycol-1,2, propylene glycol-1,3, butanediol-1,3, butanediol-1,4, hexanediol-1,6, hexanediol-2,3, octamethylene glycol, and the like, to yield the corresponding 17-ketal (II), e.g., 17(cycloethylenedioxy)-3-methoxy-$\Delta^{1,3,5(10)}$ - estratriene. This reaction will generally be carried out in the presence of a strong acid, e.g., p-toluenesulfonic acid, preferably in solution in an inert organic solvent such as benzene and the like, at reflux temperature, and will usually take about 16 hours, although longer or shorter reaction times coupled with lower or higher temperatures may be employed if desired.

The 17-ketal (II) is then treated with a cleaving agent, as described in my copending U.S. patent application Ser. No. 282,848, filed on May 24, 1963, now Patent No. 3,193,563, e.g. a double metal hydride containing at least one element of sub-group III–A of the Periodic Chart as set forth at pages 56 and 57 of Lange's "Handbook of Chemistry," Ninth edition (Sandusky, Ohio: Handbook Publishers, Inc., 1956), such as lithium aluminum hydride, potassium aluminum hydride, magnesium aluminum hydride, lithium gallium hydride, zinc aluminum hydride, sodium borohydride, potassium borohydride, aluminum borohydride, and the like, together with a Lewis acid containing no active hydrogen, and preferably a Lewis acid containing an element having an atomic number of 26 to 28 inclusive or an element of sub-group III–A of the Periodic Chart, such as ferric chloride, boron trifluoride, boron trichloride, aluminum fluoride, aluminum chloride, aluminum bromide, gallium chloride, and the like, to yield the corresponding 17α- and 17β-(hydroxy aliphatic hydrocarbonoxy)-$\Delta^{1,3,5(10)}$-estratrienes (III; $R_3$=H), e.g., 17α- and 17β-(2'hydroxyethoxy)-3-methoxy-$\Delta^{1,3,5(10)}$-estratriene being obtained by reacting 17-(cycloethylenedioxy)-3-methoxy-$\Delta^{1,3,5(10)}$-estratriene with lithium aluminum hydride and aluminum chloride in tetrahydrofurane. This reaction will generally be carried out in an organic solvent having an ether function in its molecule, e.g., diethyl ether, tetrahydrofuran, and the like, at a temperature ranging from room temperature (about 25° C.) or lower to reflux temperature or above for a period of time ranging anywhere from about 30 minutes to about 24 hours. The 17α- and 17β-derivatives can be separated by conventional chromatographic methods.

These 17α- and 17β-(hydroxy aliphatic hydrocarbonoxy)-$\Delta^{1,3,5(10)}$-estratrienes, e.g., 17α- and 17β-(2'-hydroxyethoxy)-3-methoxy-$\Delta^{1,3,5,(10)}$-estratriene, when tosylated by known procedures, e.g., using tosyl chloride in pyridine, yield the corresponding 17-(tosyloxy aliphatic hydrocarbonoxy)-$\Delta^{1,3,5(10)}$-estratrienes, e.g., 17α- and 17β-(2'-tosyloxy ethoxy)-3-methoxy-$\Delta^{1,3,5(10)}$-estratriene.

These tosylated intermediates, when treated at reflux temperature with an alkali metal halide, such as lithium chloride, potassium fluoride, potassium chloride, sodium chloride, and the like, preferably in an inert organic solvent such as dimethylformamide and the like, yield the corresponding 17-(halo aliphatic hydrocarbonoxy)-$\Delta^{1,3,5(10)}$-estratrienes (IV; X=halogen), e.g., 17α- and 17β-(2'-fluoroethoxy-3-methoxy)-$\Delta^{1,3,5(10)}$-estratriene being obtained by reacting 17α- and 17β-(2'tosyloxyethoxy)-3-methoxy-$\Delta^{1,3,5(10)}$-estratriene with potassium fluoride.

Similarly, treatment of the 17-(tosyloxy aliphatic hydrocarbonoxy)-estratriene intermediates with a dialkyl amine, preferably a di(lower) alkyl amine such as dimethyl amine, diethyl amine, methyl propyl amine, and the like, preferably in solution in an inert organic solvent such as dioxane and the like; gives the corresponding 17α- and 17β-(N,N-dialkylamino aliphatic hydrocarbonoxy)-$\Delta^{1,3,5(10)}$-estratrienes [IV; X=N(alkyl)$_2$], e.g., 17α- and 17β-[2'-(N,N-dimethylamino)-ethoxy] - 3-methoxy-$\Delta^{1,3,5(10)}$-estratriene.

Treatment of the tosyloxy intermediates with an alkali metal cyanide, e.g. sodium cyanide, potassium cyanide, and the like, preferably in solution in an inert organic solvent such as acetonitrile and the like, produces the corresponding 17α- and 17β-(cyano aliphatic hydrocarbonoxy)-$\Delta^{1,3,5(10)}$-estratrienes (IV; X=CN), e.g., 17α- and 17β-(2'-cyanoethoxy)-3-methoxy-$\Delta^{1,3,5(10)}$-estratriene.

These 17-(cyano aliphatic hydrocarbonoxy) compounds, when subjected to conventional basic hydrolysis, e.g., using aqueous sodium hydroxide or the like, afford the corresponding 17α- and 17β-(carboxy aliphatic hydrocarbonoxy)-$\Delta^{1,3,5(10)}$-estratrienes (IV; X=COOH), e.g., 17α- and 17β-(2'carboxyethoxy)-3-methoxy-$\Delta^{1,3,5(10)}$-estratriene being obtained by hydrolyzing 17α- and 17β-(2'-cyanoethoxy)3-methoxy-$\Delta^{1,3,5(10)}$-estratriene.

Treatment of the 17-(carboxy aliphatic hydrocarbonoxy) compounds with a lower alkyl magnesium halide, such as methyl magnesium bromide and the like, under conventional conditions, produces the corresponding 17α- and 17β-(n'-hydroxy-n'-alkyl aliphatic hydrocarbonoxy)-$\Delta^{1,3,5,(10)}$-estratrienes (III; $R^3$=H), n' being the carbon atom of the aliphatic hydrocarbonoxy group to which the hydroxy and alkyl groups are attached, e.g., 17α- and 17β-(3'-hydroxy-3'-methyl-butoxy)-3-methoxy-$\Delta^{1,3,5(10)}$-estratriene being the products resulting from the reaction of 17α- and 17β-(2'-carboxyethoxy)-3-methoxy-$\Delta^{1,3,5(10)}$-estratriene with methyl magnesium bromide. Dehydration of these 17-(n'-hydroxy-n'-alkyl aliphatic hydrocarbonoxy) intermediates, for example by treatment with mesyl chloride in dimethyl formamide-pyridine at about 80° C. for about 3 hours, results in the corresponding 17α- and 17β-(unsaturated aliphatic hydrocarbonoxy)-$\Delta^{1,3,5(10)}$-estratrienes (IV; X=H, R is unsaturated), e.g., 17α- and 17β-(3-hydroxy-3'-methyl-butoxy)-3-methoxy-$\Delta^{1,3,5(10)}$-estratriene yielding, on dehydration, 17α- and 17β-(3'-methyl-but-2'-enyloxy-3- methoxy-$\Delta^{1,3,5(10)}$-estratriene. Catalytic hydrogenation of these 17 - (unsaturated aliphatic hydrocarbonoxy)-$\Delta^{1,3,5(10)}$-esteratrienes, e.g., at atmospheric pressure using a 5% palladium-on-charcoal catalyst, results in the corresponding 17α- and 17β-(saturated aliphatic hydrocarbonoxy)-$\Delta^{1,3,5(10)}$-estratrienes (IV; X=H, R is saturated), e.g., 17α- and 17β-(3′methyl-but-2′-enyloxy-3-methoxy - $\Delta^{1,3,5(10)}$-estratriene, upon catalytically hydrogenation, yield 17a- and 17β- (isoamyloxy)-3-methoxy-$\Delta^{1,3,5(10)}$-estratriene.

Oxidation of a 17-(hydroxy aliphatic hydrocarbonoxy)-$\Delta^{1,3,5(10)}$-estratriene (III; $R^3$=H), e.g., 17α- or 17β-(2′-hydroxyethoxy) - 3 - methoxy-$\Delta^{1,3,5(10)}$-estratriene, preferably using chormium trioxide in pyridine, gives the corresponding 17-(oxo-aliphatic hydrocarbonoxy)-$\Delta^{1,3,5(10)}$-estratriene (IV; X=aldehydic oxygen), e.g., 17α- or 17β-(2′-oxoethoxy)-3-methoxy-$\Delta^{1,3,5(10)}$-estratriene. These 17-(oxo-aliphatic hydrocarbonoxy) derivatives, when treated with a lower alkyl, lower alkenyl or lower alkinyl magnesium halide, such as methyl magnesium bromide, vinyl magnesium bromide, ethinyl magnesium bromide, and the like, using conventional conditions, yield the corresponding 17α- and 17β-[n′-hydroxy-n′-lower (alkyl, alkenyl or alkinyl) aliphatic hydrocarbonoxy] - $\Delta^{1,3,5(10)}$-estratrienes (III; X=H, R is saturated or unsaturated), n′ again being the carbon atom of the aliphatic hydrocarbonoxy group to which the hydroxy and lower alkyl, alkenyl or alkinyl groups are attached, e.g., 17α- and 17β-(2′-hydroxy-propoxy)-3-methoxy-$\Delta^{1,3,5(10)}$-estratriene, 17α- and 17β-(2′ - hydroxy - but - 3′ - enyloxy)-3-methoxy-$\Delta^{1,3,5(10)}$-estratriene and 17α- and 17β-(2′-hydroxy-but-3-inyloxy)-3-methoxy-$\Delta^{1,3,5(10)}$-estratriene resulting from the reaction of 17α- and 17β-(2′-oxoethoxy)-3-methoxy-$\Delta^{1,3,5(10)}$-estratriene with methyl, vinyl and ethinyl magnesium bromide, respectively.

The 3-ethers of the novel 17-(aliphatic hydrocarbonoxy)- and 17-(substituted aliphatic hydrocarbonoxy)-$\Delta^{1,3,5(10)}$-estratrienes (III and IV; R≠H, acyl), and preferably those wherein $R^2$ represents hydrogen, Z represents a saturated linkage at the 6,7-position and X represents hydrogen or N,N-dialkylamino, are readily converted to the corresponding 17-(aliphatic hydrocarbonoxy)- and 17-(substituted aliphatic hydrocarbonoxy) - $\Delta^4$-estren-3-ones. This can be accomplished, for example, by first reacting the starting $\Delta^{1,3,5(10)}$-estratriene, e.g., 17α- or 17β - (isoamyloxy)-3-methoxy-$\Delta^{1,3,5(10)}$-estratriene, with an alkali metal, e.g., lithium, in liquid ammonia, then diluting the reaction mixture with ethanol to give the corresponding $\Delta^{2,5(10)}$ estradiene intermediate, e.g., 17α- or 17β - (isoamyloxy)-3-methoxy-$\Delta^{2,5(10)}$-estradiene, and finally hydroylzing this $\Delta^{2,5(10)}$-intermediate with a mineral acid such as hydrochloric acid and the like to produce the corresponding 17-(aliphatic hydrocarbonoxy)- and 17-(substituted aliphatic hydrocarbonoxy)-$\Delta^4$-estren-3-ones (V and VI), e.g., 17α- or 17β-(isoamyloxy)-$\Delta^4$-estren-3-one.

The novel 17-(halo aliphatic hydrocarbonoxy)-$\Delta^4$-estren-3-ones of the present invention, e.g., the 17-(2′ haloethoxy)-$\Delta^4$-estren-3-ones (VI; Y=halo), are preferably obtained by first tosylating the corresponding 17-(hydroxy aliphatic hydrocarbonoxy)-$\Delta^4$-estren-3-ones and then reacting the tosylated intermediates with an alkali metal halide in the manner described hereinabove.

The compounds of the present invention having a primary, a secondary or a phenolic hydroxyl group, for example, the compounds represented by the Formula I above wherein $R^1$ represents hydrogen or the compounds of Formula III above wherein $OR^3$ represents a primary or secondary hydroxyl group, are preferably acylated by reaction with a suitable acid chloride or anhydride in pyridine in the manner well known in the art. Similarly, the compounds of the present invention having a tertiary hydroxyl group, for example, the compounds represented by Formula III above wherein $OR^3$ represents a tertiary hydroxyl group, are preferably esterified by reaction with a suitable acid anhydried in pyridine, in the presence of an acid catalyst such as p-toluenesulfonic acid and the like, in the manner well known in the art.

The following specific examples serve to illustrate, but are not intended to limit the scope of the present invention:

PREPARATION 1

To a suspension of 25 g. of 1-methyl estrone in 25 cc. of acetone there was added a solution of 70 g. of potassium hydroxide in 37.5 cc. of water and the stirred mixture was treated dropwise with 40 cc. of methyl sulfate. The reaction mixture was then stirred for 45 minutes further, poured into dilute hydrochloric acid solution and the formed precipitate collected by filtration. The collected solid was washed with water to neutral, and dried under reduced pressure. Chromatography of the dry residue on 300 g. of alumina, followed by crystallization of the solid fractions eluted, from a mixture of chloroform-methanol, furnished the methyl ether of 1-methyl estrone.

Following the same procedure there were treated:

$\Delta^6$-dehydroestrone and
1-methyl-$\Delta^6$-dehydroestrone, thus yielding respectively:

The methyl-ether of $\Delta^6$-dehydroestrone and
The methyl-ether of 1-methyl-$\Delta^6$-dehydroestrone.

Example I

A mixture of 1 g. of estrone methyl ether, 25 cc. of dry benzene, 5 g. of ethyleneglycol, 50 mg. of p-toluenesulfonic acid monohydrate, was refluxed for 16 hours using a water separator. It was then washed with a sodium bicarbonate solution, water and subsequently dried and evaporated to dryness. Recrystallization from acetone-hexane yielded 17-(cycloethylenedioxy) - 3 - methoxy-$\Delta^{1,3,5(10)}$-estratriene (Compound No. 1).

Example II

A solution of 1 g. of Compound No. 1 in 50 cc. of tetrahydrofuran was added over a 30 minutes period to a stirred suspension of 1 g. of lithium aluminum hydride and 6 g. of aluminum trichloride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate; the combined organic solutions upon evaporation yielded a crude material, which after chromatography and crystallization of the solid fractions from acetone-hexane afforded two products, predominantly 17β - (2′ - hydroxy ethoxy)-3-methoxy-$\Delta^{1,3,5(10)}$-estratriene (Cpd. No. 2) and 17α-(2′-hydroxy ethoxy)-3-methoxy-$\Delta^{1,3,5(10)}$-estratriene (Cpd. No. 3) in smaller amount.

Example III

A mixture of 1 g. of Compound No. 2, 4 cc. of pyridine and 2 cc. of acetic anhydride was kept at room temperature overnight, poured into ice water, the formed precipitate was filtered, washed with water and dried. Crystallization from acetone-hexane gave 17β - (2′ - acetoxyethoxy) - 3 - methoxy-$\Delta^{1,3,5(10)}$-estratriene (Cpd. No. 4).

Example IV

The Compound No. 2 was treated according to Example III except that acetic anhydride was substituted by caproic anhydride and cyclopentylpropionic anhydride, thus yielding respectively: 17β - (2′ - caproxyethoxy) - 3 - methoxy-$\Delta^{1,3,5(10)}$-estratriene (Cpd. No. 5) and 17β-(2′-cyclopentylpropionoxy - ethoxy) - 3 - methoxy - $\Delta^{1,3,5(10)}$-estratriene (Cpd. No. 6).

Example V

A solution of 1 g. of Compound No. 2 in 5 cc. of pyridine was treated with 0.5 g. of tosyl chloride and kept at room temperature for 24 hours, it was then diluted with water and the precipitate separated by filtration, thus giving 17β - (2' - tosyloxyethoxy) - 3 - methoxy - $\Delta^{1,3,5(10)}$-estratriene (Cpd. No. 7).

Example VI

A suspension of 10 g. of potassium fluoride in 50 cc. of dimethyl formamide was heated to boiling and then a solution of 2 g. of Compound No. 7 in 10 cc. of dimethyl formamide was added. The mixture was refluxed for 5 hours, cooled and poured into water. The formed precipitate was filtered off and crystallized to give 17β - (2' - fluoroethoxy) - 3-methoxy-$\Delta^{1,3,5(10)}$-estratriene (Cpd. No. 8).

Example VII

The Compound No. 7 was treated according to Example VI, except that potassium chloride was used instead of potassium fluoride, thus yielding 17β-(2'-chloroethoxy) 3-methoxy-$\Delta^{1,3,5(10)}$-estratriene (Cpd. No. 9).

Example VIII

A solution of 1 g. of Compound No. 7 in 50 cc. of dioxane was treated with a constant stream of dimethylamine during 48 hours. Thereafter, the solution was boiled under reflux for 30 minutes and poured into water, thus affording a precipitate which was filtered off, dried and recrystallized from methanol-benzene, thus furnishing 17β-(2' - [N,N - dimethylamino]-ethoxy)-3-methoxy-$\Delta^{1,3,5(10)}$-estratriene (Cpd. No. 10).

Example IX

A mixture of 1 g. of Compound No. 7, 1 g. of potassium cyanide and 50 cc. of acetonitrile was kept at 100° C. for 3 hours. The mixture was then poured into water, and the formed precipitate filtered off, dried and crystallized from acetone-hexane, thus yielding 17β-(2'-cyanoethoxy)-3-methoxy-$\Delta^{1,3,5(10)}$-estratriene (Cpd. No. 11).

Example X

A mixture of 1 g. of Compound No. 11, and 50 cc. of a 5% solution of sodium hydroxide in methanol, was refluxed during 4 hours, then cooled, acidified with hydrochloric acid and diluted with water. The formed precipitate was collected by filtration and recrystallized from acetone-hexane, thus yielding 17β-(2'-carboxyethoxy)-3-methoxy-$\Delta^{1,3,5(10)}$-estratriene (Cpd. No. 12).

Example XI

A solution of 5 g. of compound No. 12 in 250 cc. of thiophene-free benzene was treated with 55 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17β - (3' - hydroxy-3'-methyl-butoxy)-3-methoxy-$\Delta^{1,3,5(10)}$-estratriene (Cpd. No. 13).

Example XII 1 g. of Compound No. 13 was dissolved with slow heating in 12.5 cc. of dimethyl-formamide, the mixture was cooled, 0.42 g. of mesyl chloride and 0.5 cc. of pyridine were added and the solution was kept at 80° C. for 3 hours. The reaction mixture was cooled, water was added and the product was extracted with ethyl acetate. The extract was washed with water, dried over anhydrous sodium sulfate and the solvent was evaporated. Recrystallization of the residue from acetone-hexane furnished 17β - (3' - methyl-but-2'-enyloxy)-3-methoxy-$\Delta^{1,3,5(10)}$-estratriene (Cpd. No. 14).

Example XIII

A suspension of 0.5 g. of 5% palladium on carbon catalyst in 50 cc. of methanol was hydrogenated for 30 minutes. A solution of 2 g. of Compound No. 14 in 200 cc. of methanol was added to the catalyst and stirred under a hydrogen atmosphere until the uptake of hydrogen ceased. After removal of the catalyst by filtration the solution was evaporated and the crude residue was purified by crystallization from methylene-chloride-hexane, thus giving 17β-(isoamyloxy)-3-methoxy-$\Delta^{1,3,5(10)}$-estratriene (Cpd. No. 15).

Example XIV

A cold solution of 6 g. of Compound No. 15 in 750 cc. of anhydrous ether was added to 900 cc. of liquid ammonia and then 7.8 g. of lithium wire over 10 minutes, with constant stirring. The mixture was stirred for 20 minutes more, 160 cc. of absolute ethanol were then cautiously added and the ammonia was allowed to evaporate. Water was added to the residue, the ether distilled off and the resulting 17β-(isoamyloxy)-3-methoxy-$\Delta^{2,5(10)}$-estradiene (Cpd. No. 16) collected, washed with water and dried.

A mixture containing the latter compound, 220 cc. of methanol and 132 cc. of 3 N hydrochloric acid was heated at 60° C. for 18 minutes. The solution was cooled, poured into iced water and the resulting precipitate was collected, washed with water and dried. Crystallization from acetone-hexane yielded 17β-(isoamyloxy)-$\Delta^4$-estren - 3 - one (Cpd. No. 17).

Example XV

The Compounds Nos. 2, 3, 10 and 13, were treated according to Example XIV, thus affording respectively the following final products:

Cpd. No.:
18—17β-(2'-hydroxyethoxy)-$\Delta^4$-estren-3-one
19—17α-(2'-hydroxyethoxy)-$\Delta^4$-estren-3-one
20—17β-(2'-[N,N-dimethylamino]-ethoxy)-$\Delta^4$-estren-3-one
21—17β-(3'-hydroxy-3'-methyl-butoxy) - $\Delta^4$ - estren-3-one

Example XVI

The Compound No. 18 was treated successively according to Examples V and VI, thus yielding respectively:
17β-(2'-tosyloxyethoxy)-$\Delta^4$-estren-3-one (Cpd. No. 22) and 17β-(2'-fluoroethoxy)-$\Delta^4$-estren-3-one (Cpd. No. 23).

Example XVII

The Compound No. 22 was treated according to Example VII, thus furnishing 17β-(2'-chloroethoxy)-$\Delta^4$-estren-3-one (Cpd. No. 24).

Example XVIII

The Compound No. 18 was treated in accordance with Examples Nos. III and IV, thus yielding respectively:

Cpd. No.:
25—17β-(2'-acetoxyethoxy)-$\Delta^4$-estren-3-one
26—17β-(2'-caproxyethoxy)-$\Delta^4$-estren-3-one
27—17β-(2'-cyclopentylpropionoxyethoxy)-$\Delta^4$-estren-3-one

Example XIX

The Compound No. 3 was treated according to Examples III, IV and V, to produce respectively:

Cpd. No.:
28—17α-(2'-acetoxyethoxyl)-3-methoxy-$\Delta^{1,3,5(10)}$-estratriene

29—17α-(2'-caproxyethoxy)-3-methoxy-Δ$^{1,3,5(10)}$-estratriene
30—17α-(2'-cyclopentylpropionoxyethoxy)-3-methoxy-Δ$^{1,3,5(10)}$-estratriene
31—17α-(2'-tosyloxyethoxy)-3-methoxy-Δ$^{1,3,5(10)}$-estratriene

Example XX

The Compound No. 31 was treated according to Examples VI, VII, VIII and IX, thus furnishing respectively:

Cpd. No.:
    32—17α-(2'-fluoroethoxy)-3-methoxy-Δ$^{1,3,5(10)}$-estratriene
    33—17α-(2'-chloroethoxy)-3-methoxy-Δ$^{1,3,5(10)}$-estratriene
    34—17α-(2'-[N,N-dimethylamino]-ethoxy)-3-methoxy-Δ$^{1,3,5(10)}$-estratriene
    35—17α-(2'-cyanoethoxy)-3-methoxy-Δ$^{1,3,5(10)}$-estratriene

Example XXI

The Compound No. 35 was treated consecutively in accordance with Examples X, XI, XII and XIII, thus affording respectively:

Cpd. No.:
    36—17α-(2'-carboxyethoxy)-3-methoxy-Δ$^{1,3,5(10)}$-estratriene
    37—17α-(3'-hydroxy-3'-methyl-but-oxy)-3-methoxy-Δ$^{1,3,5(10)}$-estratriene
    38—17α-(3'-methyl-but-2'-enyloxy)-3-methoxy-Δ$^{1,3,5(10)}$-estratriene
    39—17α-(isoamyloxy)-3-methoxy-Δ$^{1,3,5(10)}$-estratriene

Example XXII

The Compounds Nos. 34, 37 and 39 were treated by the procedure described in Example XIV, thus affording, respectively, final products:

Cpd. No.:
    40—17α-(2'-[N,N-dimethylamino]-ethoxy)-Δ$^4$-estren-3-one
    41—17α-(3'-hydroxy-3'-methylbutoxy) - Δ$^4$ - estren-3-one
    42—17α-(isoamyloxy)-Δ$^4$-estren-3-one

Example XXIII

The Compound No. 19 was treated, successively, according to Examples V and VI, thus yielding respectively: 17α-(2'-tosyloxyethoxy)-Δ$^4$-estren-3-one (Cpd. No. 43), and 17α-(2'-fluoroethoxy)-Δ$^4$-estren-3-one (Cpd. No. 44).

Example XXIV

The Compound No. 43 was treated according to Example VII, thus furnishing 17α-(2'-chloroethoxy)-Δ$^4$-estren-3-one (Cpd. No. 45).

Example XXV

The Compound No. 19 was treated in accordance with Examples III and IV, thus affording respectively:

Cpd. No.:
    46—17α-(2'-acetoxyethoxy)-Δ$^4$-estren-3-one
    47—17α-(2'-caproxyethoxy)-Δ$^4$-estren-3-one
    48—17α-(2'-cyclopentylpropionoxyethoxy)-Δ$^4$-estren-3-one

Example XXVI

The starting compounds set forth under A, were treated according to Example I, thus affording the corresponding products listed hereinafter under B:

| A | Cpd. No. | B |
|---|---|---|
| Estrone | 49 | 17-cycloethylenedioxy-3-hydroxy-Δ$^{1,3,5(10)}$-estratriene. |
| Benzyl ether of estrone | 50 | 17-cycloethylenedioxy-3-benzyloxy-Δ$^{1,3,5(10)}$-estratriene. |
| n-Butyl ether of estrone | 51 | 17-cycloethylenedioxy-3-n-butoxy-Δ$^{1,3,5(10)}$-estratriene. |
| n-Decyl ether of estrone | 52 | 17-cycloethylenedioxy-3-n-decyloxy-Δ$^{1,3,5(10)}$-estratriene. |
| Cyclopentyl ether of estrone | 53 | 17-cycloethylenedioxy-3-cyclopentyloxy-Δ$^{1,3,5(10)}$-estratriene. |
| Isoamyl ether of estrone | 54 | 17-cycloethylenedioxy-3-isoamyloxy-Δ$^{1,3,5(10)}$-estratriene. |
| 1-Methyl estrone | 55 | 17-cycloethylenedioxy-3-hydroxy-1-methyl-Δ$^{1,3,5(10)}$-estratriene. |
| Methyl ether of 1-methyl estrone. | 56 | 17-cycloethylenedioxy-3-methoxy-1-methyl-Δ$^{1,3,5(10)}$-estratriene. |
| Δ$^6$-dehydroestrone | 57 | 17-cycloethylenedioxy-3-hydroxy-Δ$^{1,3,5(10),6}$-estratetraene. |
| Methyl ether of Δ$^6$-dehydro estrone. | 58 | 17-cycloethylenedioxy-3-methoxy-Δ$^{1,3,5(10),6}$-estratetraene. |
| 1-methyl-Δ$^6$-dehydroestrone | 59 | 17-cycloethylenedioxy-3-hydroxy-1-methyl-Δ$^{1,3,5(10),6}$-estratetraene. |
| Methyl ether of 1-methyl-Δ$^6$-dehydroestrone. | 60 | 17-cycloethylenedioxy-3-methoxy-1-methyl-Δ$^{1,3,5(10),6}$-estratetraene. |

Example XXVII

The Compounds Nos. 49 to 60, inclusive, were treated according to Example II, thus yielding, predominantly, the respective products listed hereinafter under A, and in smaller amount, those listed under B.

| Cpd. No. | A | Cpd. No. | B |
|---|---|---|---|
| 61 | 17β-(2'-hydroxyethoxy)-3-hydroxy-Δ$^{1,3,5(10)}$-estratriene. | 73 | 17α-(2'-hydroxy ethoxy)-3-hydroxy-Δ$^{1,3,5(10)}$-estratriene. |
| 62 | 17β-(2'-hydroxyethoxy)-3-benzyloxy-Δ$^{1,3,5(10)}$-estratriene. | 74 | 17α-(2'-hydroxy ethoxy)-3-benzyloxy-Δ$^{1,3,5(10)}$-estratriene. |
| 63 | 17β-(2'-hydroxyethoxy)-3-n-butoxy-Δ$^{1,3,5(10)}$-estratriene. | 75 | 17α-(2'-hydroxy ethoxy)-3-n-butoxy-Δ$^{1,3,5(10)}$-estratriene. |
| 64 | 17β-(2'-hydroxyethoxy)-3-n-decyloxy-Δ$^{1,3,5(10)}$-estratriene. | 76 | 17α-(2'-hydroxy ethoxy)-3-n-decyloxy-Δ$^{1,3,5(10)}$-estratriene. |
| 65 | 17β-(2'-hydroxyethoxy)-3-cyclopentyloxy-Δ$^{1,3,5(10)}$-estratriene. | 77 | 17α-(2'hydroxy ethoxy)-3-cyclopentyloxy-Δ$^{1,3,5(10)}$-estratriene. |
| 66 | 17β-(2'-hydroxyethoxy)-3-isoamyloxy-Δ$^{1,3,5(10)}$-estratriene. | 78 | 17α-(2'-hydroxy ethoxy)-3-isoamyloxy-Δ$^{1,3,5(10)}$-estratriene. |
| 67 | 17β-(2'-hydroxyethoxy)-3-hydroxy-1-methyl-Δ$^{1,3,5(10)}$-estratriene. | 79 | 17α-(2'-hydroxy ethoxy)-3-hydroxy-1-methyl-Δ$^{1,3,5(10)}$-estratriene. |
| 68 | 17β-(2'-hydroxyethoxy)-3-methoxy-1-methyl-Δ$^{1,3,5(10)}$-estratriene. | 80 | 17α-(2'-hydroxy ethoxy)-3-methoxy-1-methyl-Δ$^{1,3,5(10)}$-estratriene. |
| 69 | 17β-(2'-hydroxyethoxy)-3-hydroxy-Δ$^{1,3,5(10),6}$-estratetraene. | 81 | 17α-(2'-hydroxy ethoxy)-3-hydroxy-Δ$^{1,3,5(10),6}$-estratetraene. |
| 70 | 17β-(2'-hydroxyethoxy)-3-methoxy-Δ$^{1,3,5(10),6}$-estratetraene. | 82 | 17α-(2'-hydroxy ethoxy)-3-methoxy-Δ$^{1,3,5(10),6}$-estratetraene. |
| 71 | 17β-(2'-hydroxyethoxy)-3-hydroxy-1-methyl-Δ$^{1,3,5(10),6}$-estratetraene. | 83 | 17α-(2'-hydroxy ethoxy)-3-hydroxy-1-methyl-Δ$^{1,3,5(10),6}$-estratetraene. |
| 72 | 17β-(2'-hydroxyethoxy)-3-methoxy-1-methyl-Δ$^{1,3,5(10),6}$-estratetraene. | 84 | 17α-(2'-hydroxy ethoxy)-3-methoxy-1-methyl-Δ$^{1,3,5(10),6}$-estratetraene. |

Example XXVIII

The Compounds Nos. 61 to 72, inclusive, were treated according to Example III, thus yielding respectively:

Cpd. No.:
    85—17α-(2'-acetoxy ethoxy)-3-acetoxy-Δ$^{1,3,5(10)}$-estratriene
    86—17β-(2'-acetoxy ethoxy)-3-benzyloxy - Δ$^{1,3,5(10)}$-estratriene
    87—17β-(2'-acetoxy ethoxy)-3-butoxy-Δ$^{1,3,5(10)}$-estratriene
    88—17β-(2'-acetoxy ethoxy)-3-n-decyloxy-Δ$^{1,3,5(10)}$-estratriene 89—17β-(2'-acetoxy ethoxy)-3-cyclopentyloxy-Δ$^{1,3,5(10)}$-estratriene
90—17β-(2'-acetoxy ethoxy)-3-isoamyloxy-Δ$^{1,3,5(10)}$-estratriene
91—17β-(2'-acetoxy ethoxy)-3-acetoxy-1-methyl-Δ$^{1,3,5(10)}$-estratriene
92—17β-(2'-acetoxy ethoxy)-3-methoxy-1-methyl-Δ$^{1,3,5(10)}$-estratriene
93—17β-(2'-acetoxy ethoxy)-3-acetoxy-Δ$^{1,3,5(10),6}$-estratetraene
94—17β-(2'-acetoxy ethoxy)-3-methoxy-Δ$^{1,3,5(10),6}$-estratetraene
95—17β-(2'-acetoxy ethoxy)3-acetoxy-1-methyl-Δ$^{1,3,5(10),6}$-estratetraene
96—17β-(2'-acetoxy ethoxy)-3-methoxy-1-methyl-Δ$^{1,3,5(10),6}$-estratetraene Upon treatment of Compounds Nos. 61 to 72, inclusive, by the procedures of Example IV, there were obtained the corresponding compounds having, respectively, caproxy and cyclopentylpropionoxy groups instead of acetoxy groups.

Example XXIX

The Compounds Nos. 61 to 72, inclusive, were treated according to Example V, thus affording the corresponding 17β-(2'-tosyloxy ethoxy) derivatives, which in turn were treated in accordance with Example VI, giving respectively:

Cpl. No.:
97—17β-(2'-fluoro ethoxy)-3-hydroxy-Δ$^{1,3,5(10)}$-estratriene
98—17β-(2'-fluoro ethoxy)-3-benzyloxy-Δ$^{1,3,5(10)}$-estratriene
99—17β-(2'-fluoro ethoxy)-3-n-butoxy-Δ$^{1,3,5(10)}$-estratriene
100—17β-(2'-fluoro ethoxy)-3-n-decyloxy-Δ$^{1,3,5(10)}$-estratriene
101—17β-(2'-fluoro ethoxy)-3-cyclopentyloxy-Δ$^{1,3,5(10)}$-estratriene
102—17β-(2'-fluoro ethoxy)-3-isoamyloxy-Δ$^{1,3,5(10)}$-estratriene
103—17β-(2'-fluoro ethoxy)-3-hydroxy-1-methyl-Δ$^{1,3,5(10)}$-estratriene
104—17β-(2'-fluoro ethoxy)-3-methoxy-1-methyl-Δ$^{1,3,5(10)}$-estratrine
105—17β-(2'-fluoro ethoxy)-3-hydroxy-Δ$^{1,3,5(10),6}$-estratetraene
106—17β-(2'-fluoro ethoxy)-3-methoxy-Δ$^{1,3,5(10),6}$-estratetraene
107—17β-(2'-fluoro ethoxy)-3-hydroxy-1-methyl-Δ$^{1,3,5(10),6}$-estratetraene
108—17β-(2'-fluoro ethoxy)-3-methoxy-1-methyl-Δ$^{1,3,5(10),6}$-estratetraene By treatment of 17β-(2'-tosyloxy-ethoxy) compounds mentioned hereinbefore by the procedure of Example VII, there were produced the corresponding 17β-(2'-chloro ethoxy) compounds.

Example XXX

When treating the 17β-(2'tosyloxy ethoxy) compounds of Example XXIX, in accordance with Examples VIII and IX, there were produced, respectively, the corresponding 17β-(2'-[N,N-dimethylamino]ethoxy) and 17β-(2'-cyano ethoxy) derivatives.

The latter derivatives, in turn, were treated successively, by the procedures described in Examples X, XI, XII, and XIII, thus yielding, respectively, the corresponding 17β-(2'carboxy ethoxy), 17β-(3'-hydroxy-3'-methyl-butoxy), 17β-(3'-methyl-but-2'-enyloxy) and 17β-(isoamyloxy) compounds.

Example XXXI

The reactions set forth in Examples XXVIII, XXIX, and XXX for the 17β-compounds, were applied to the 17α-compounds described in Example XXVII, thus yielding the corresponding 17α-isomers of the products of said examples.

Examples XXXII

Estrone methyl ether was treated according to Example I, except that ethyleneglycol was substituted by hexamethylene glycol (1,6-hexanediol) and by 2,3-hexane diol, thus yielding respectively 17-(cyclohexamethylene dioxy)-3-methoxy-Δ$^{1,3,5(10)}$-estratriene (Cpd. No. 109), and 17-(hexane-2',3'-dioxy)-3-methoxy-Δ$^{1,3,5(10)}$-estratriene (Cpd. No. 110). These compounds when treated by the procedure described in Example II, yielded, respectively and predominantly 17β - (6' - hydroxyhexyloxy)-3-methoxy-Δ$^{1,3,5(10)}$-estratriene (Cpd. No. 111) and 17β-(3'-hydroxyhexyl-2'-oxy)-3-methoxy-Δ$^{1,3,5(10)}$-estratriene (Cpd. No. 112) and in smaller amount the corresponding 17α-isomers thereof.

Example XXXIII

The starting compounds of Example XXVI were treated in accordance with Example XXXII, thus being produced the corresponding 17-(cyclohexamethylenedioxy) and 17-(hexane-2',3'-dioxy) derivatives and therefrom, respectively and predominantly, the corresponding 17β-(6'-hydroxyhexyloxy)- and 17β-(3'-hydroxy hexyl-2'-oxy) compounds and in smaller amount the corresponding 17α-isomers thereof.

Example XXXIV

A solution of 6 g. of compound No. 2 in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 17β-(2'-oxo ethoxy)-3-methoxy-Δ$^{1,3,5(10)}$-estratriene (Cpd. No. 113).

Upon treatment of the latter compound by the procedure described in Example XI, there was produced 17β-(2' - hydroxy - propoxy)-3-methoxy-Δ$^{1,3,5(10)}$-estratriene (Cpd. No. 114).

The Compounds Nos. 61 to 72, inclusive were treated by the same procedures thus yielding firstly the corresponding 17β-(2'-oxoethoxy)-derivatives and secondly the following respective compounds.

Cpd. No.:
115—17β-(2'-hydroxy propoxy)-3-hydroxy-Δ$^{1,3,5(10)}$-estratriene
116—17β-(2'-hydroxy propoxy)-3-benzyloxy-Δ$^{1,3,5(10)}$-estratriene
117—17β-(2'-hydroxy propoxy)-3-n-butoxy-Δ$^{1,3,5(10)}$-estratriene
118—17β-(2'-hydroxy propoxy)-3-n-decyloxy-Δ$^{1,3,5(10)}$-estratriene
119—17β-(2'-hydroxy propoxy)-3-cyclopentyloxy-Δ$^{1,3,5(10)}$-estratriene
120—17β-(2'-hydroxy propoxy)-3-isoamyloxy-Δ$^{1,3,5(10)}$-estratriene
121—17β-(2'-hydroxy propoxy)-3-hydroxy-1-methyl-Δ$^{1,3,5(10)}$-estratriene
122—17β-(2'-hydroxy propoxy)-3-methoxy-1-methyl-Δ$^{1,3,5(10)}$-estratriene
123—17β-(2'-hydroxy propoxy)-3-hydroxy-Δ$^{1,3,5(10),6}$-estratetraene
124-17β-(2'-hydroxy propoxy)-3-methoxy-Δ$^{1,3,5(10),6}$-estratetraene
125—17β-(2'-hydroxy propoxy)-3-hydroxy-1-methyl-Δ$^{1,3,5(10),6}$-estratetraene
126—17β-(2'-hydroxy propoxy)-3-methoxy-1-methyl-Δ$^{1,3,5(10),6}$-estratetraene

Example XXXV

The Compound No. 113 was treated according to Example XI, except that methyl magnesium bromide was substituted by vinyl magnesium bromide and by ethinyl magnesium bromide, thus yielding respectively: 17β-(2'- hydroxy - but - 3'-enyloxy)-3-methoxy Δ¹,³,⁵⁽¹⁰⁾-estratriene (Cpd. No. 127) and 17β-(2'-hydroxy-but-3'-inyloxy)-3-methoxy-Δ¹,³,⁵⁽¹⁰⁾-estratriene (Cpd. No. 128).

The rest of the 17β-(2'-oxoethoxy) derivatives obtained in accordance with Example XXXIV were treated by the same procedures, thus yielding respectively, the corresponding 17β-(2'-hydroxy-2'-vinyl-ethoxy) and 17β-(2'-hydroxy-2'-ethinyl-ethoxy) compounds.

*Example XXXVI*

The Compounds Nos. 111, 112, 114, 127 and 128 were treated according to Example III, thus yielding respectively:

Cpd. No.:
129—17β-(6'-acetoxy-hexyloxy)-3-methoxy-
  Δ¹,³,⁵⁽¹⁰⁾-estratriene
130—17β-(3'-acetoxy-hexyl-2'-oxy)-3-methoxy-
  Δ¹,³,⁵⁽¹⁰⁾-estratriene
131—17β-(2'-acetoxy-propoxy)-3-methoxy-
  Δ¹,³,⁵⁽¹⁰⁾-estratriene
132—17β-(2'-acetoxy-but-3'-enyloxy)-
  Δ¹,³,⁵⁽¹⁰⁾-estratriene
133—17β-(2'-acetoxy-but-3'-inyloxy)-3-methoxy-
  Δ¹,³,⁵⁽¹⁰⁾-estratriene Upon treatment of the above starting compounds in accordance with Example IV, there were obtained the corresponding caproxy and cyclopentylpropionoxy derivatives.

*Example XXXVII*

The Compounds Nos. 14, 111, 112, 114, and 127 were treated according to Example XIV, thus yielding respectively:

Cpd. No.:
134—17β-(3'-methyl-but-2'-enyloxy)Δ⁴-estren-3-one
135—17β-(6'-hydroxyhexyloxy)-Δ⁴-estren-3-one
136—17β-(3'-hydroxyhexyl-2'-oxy)-Δ⁴-estren-3-one
137—17β-(2'-hydroxypropoxy)-Δ⁴-estren-3-one
138—17β-(2'-hydroxy-but-3'-enyloxy)-Δ⁴-estren-
  3-one

*Example XXXVIII*

Upon treatment of Compound No. 128 by the procedure of Example XIV, there were produced: 17β-(2'-hydroxy-but-3'-enyloxy)-Δ⁴-estren-3-one (Cpd. No. 138) and 17β - (2' - hydroxy - but - 3'-inyloxy)-Δ⁴-estren-3-one (Cpd. No. 139).

*Example XXXIX*

The Compounds Nos. 134 to 139, inclusive, were treated according to Examples Nos. III and IV, thus affording the corresponding acetoxy, caproxy and cyclopentylpropionoxy derivatives.

*Example XL*

To a solution of 5 g. of Compound No. 13 in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17β-(3'-acetoxy-3'-methyl-butoxy)-3-methoxy-Δ¹,³,⁵⁽¹⁰⁾-estratriene (Cpd. No. 140). By the same procedure, Compound No. 21 was converted into 17β-(3'-acetoxy - 3' - methyl-butoxy)-Δ⁴-estren-3-one (Cpd. No. 141).

*Example XLI*

The Compounds Nos. 114 to 128, inclusive were treated according to Example V, thus yielding the corresponding tosyloxy derivatives, which upon treatment in accordance with Examples VI, VII, VIII, and IX afforded, respectively the corresponding (fluoro, chloro, N,N-dimethylamino, and cyano) 17-substituted side chain derivatives. The latter cyano compounds upon successive treatment in accordance with Examples X, XI, XII and XIII, yielded respectively the corresponding (carboxy, 2'-hydroxy isopropyl, isopropylidene and isopropyl) 17 substituted side chain derivatives.

I claim:
1. 17-(2'-fluoroethoxy)-3-methoxy-Δ¹,³,⁵⁽¹⁰⁾-estratriene.
2. 17-(2'-chloroethoxy)-3-methoxy-Δ¹,³,⁵⁽¹⁰⁾-estratriene.
3. 17-(2'-cyanoethoxy)-3-methoxy-Δ¹,³,⁵⁽¹⁰⁾-estratriene.
4. 17 - (2'-carboxyethoxy)-3-methoxy-Δ¹,³,⁵⁽¹⁰⁾-estratri-
5. 17-(isoamyloxy)-3-methoxy-Δ¹,³,⁵⁽¹⁰⁾-estratriene.
6. 17-(isoamyloxy)-Δ⁴-estren-3-one.
7. 17-(2'-fluoroethoxy)-3-hydroxy-Δ¹,³,⁵⁽¹⁰⁾-estratriene.
8. 17-(2'-chloroethoxy)-3-hydroxy-Δ¹,³,⁵⁽¹⁰⁾-estratriene.
9. A compound represented by the general formula:

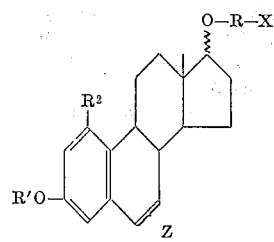

wherein R represents an aliphatic hydrocarbon residue containing from 1 to 10 carbon atoms, inclusive, OR' is selected from the group consisting of hydroxyl, an acyloxy group containing less than 12 carbon atoms, and an ether group containing from 1 to 12 carbon atoms, inclusive; R² is selected from the group consisting of hydrogen and methyl; Z is selected from the group consisting of a saturated linkage and a double bond at the 6,7-position, and X' is halogen.

10. A compound represented by the general formula:

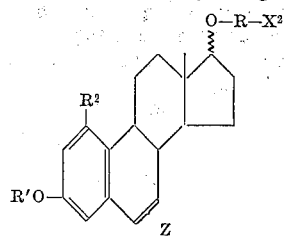

wherein R represents an aliphatic hydrocarbon residue containing from 1 to 10 carbon atoms, inclusive; OR' is selected from the group consisting of hydroxyl and an acyloxy group containing less than 12 carbon atoms; R² is selected from the group consisting of hydrogen and methyl; Z is selected from the group consisting of a saturated linkage and a double bond at the 6,7-position, and X² is an N,N-dialkylamino group.

11. A compound represented by the general formula:

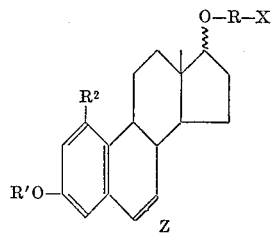

wherein R represents an aliphatic hydrocarbon residue containing from 1 to 10 carbon atoms, inclusive; OR' is selected from the group consisting of hydroxyl, an acyloxy group containing less than 12 carbon atoms, and an ether group containing from 1 to 12 carbon atoms, inclusive; R² is selected from the group consisting of hydrogen and methyl; Z is selected from the group consisting of a saturated linkage and a double bond at the 6,7-position, and X³ is a carboxyl group.

12. A compound represented by the general formula:

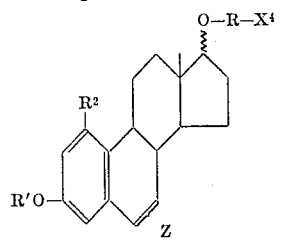

wherein R represents an aliphatic hydrocarbon residue containing from 1 to 10 carbon atoms, inclusive, OR' is selected from the group consisting of hydroxyl, an acyloxy group containing less than 12 carbon atoms, and an ether group containing from 1 to 12 carbon atoms, inclusive; $R^2$ is selected from the group consisting of hydrogen and methyl; Z is selected from the group consisting of a saturated linkage and a double bond at the 6,7-position, and $X^4$ is a cyano group.

13. A compound represented by the general formula:

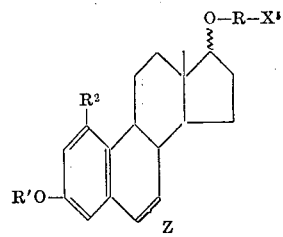

wherein R represents an aliphatic hydrocarbon residue containing from 1 to 10 carbon atoms, inclusive; OR' is selected from the group consisting of hydroxyl, an acyloxy group containing less than 12 carbon atoms, and an ether group containing from 1 to 12 carbon atoms, inclusive; $R^2$ is selected from the group consisting of hydrogen and methyl; Z is selected from the group consisting of a saturated linkage and a double bond at the 6,7-position, and $X^5$ is an aldehydic oxygen.

14. A compound represented by the general formula:

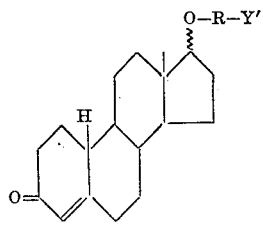

wherein R represents an aliphatic hydrocarbon residue containing from 1 to 10 carbon atoms, inclusive, and Y' is halogen.

15. A compound represented by the general formula:

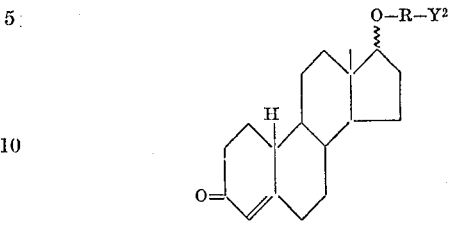

wherein R represents an aliphatic hydrocarbon residue containing from 1 to 10 carbon atoms, inclusive, and $Y^2$ is an N,N-dialkylamino group.

16. A compound having the formula

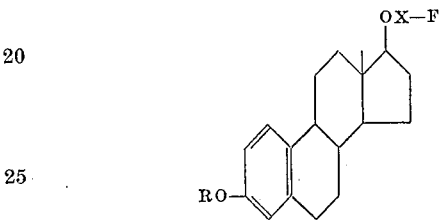

wherein X is lower alkylene and R is lower alkyl.

17. A compound having the formula

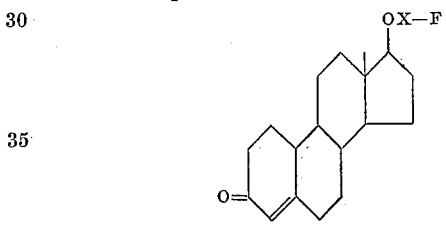

wherein X is lower alkylene.

References Cited

UNITED STATES PATENTS 2,979,518   4/1961   Van Dorp et al. ___ 260—397.45

FOREIGN PATENTS 803,440   10/1958   Great Britain.
804,789   11/1958   Great Britain.

ELBERT L. ROBERTS, *Primary Examiner.*

LEWIS GOTTS, *Examiner.*

UNITED STATES PATENT OFFICE
CERTIFICATE OF CORRECTION

Patent No. 3,374,251                                        March 19, 1968

Alexander D. Cross

It is hereby certified that error appears in the above numbered patent requiring correction and that the said Letters Patent should read as corrected below.

Column 1, the upper right-hand portion of formula "A" reading $\underset{\}{O}$-R-RO$^3$          should read          $\underset{\}{O}$-R-OR$^3$ Column 3, the upper right-hand portion of formula "VI" reading $\underset{\}{O}$-R-X          should read          $\underset{\}{O}$-R-Y Column 11, line 44, "-estratrine" should read -- -estratriene --.
Column 14, line 11, "-estratri-" should read -- -estratriene --.

Signed and sealed this 12th day of August 1969.

(SEAL)
Attest:

EDWARD M. FLETCHER, JR.                        WILLIAM E. SCHUYLER, JR.
Attesting Officer                                Commissioner of Patents